United States Patent [19]

Worthley

[11] 3,908,079
[45] Sept. 23, 1975

[54] SURFACE ROUGHNESS MEASUREMENT INSTRUMENT
[75] Inventor: Warren William Worthley, Fort Wayne, Ind.
[73] Assignee: General Electric Company, Schenectady, N.Y.
[22] Filed: Feb. 15, 1974
[21] Appl. No.: 442,814

[52] U.S. Cl. ...... 178/6.8; 178/DIG. 1; 178/DIG. 36; 356/109
[51] Int. Cl.² .......................................... H04N 7/02
[58] Field of Search......178/DIG.1, DIG.34, DIG. 36, 178/DIG. 22, 6.8; 356/109; 73/105

[56] References Cited
UNITED STATES PATENTS
3,529,240  9/1970  Sanders............................... 73/105
3,666,885  5/1972  Hemsley et al. ................ 178/DIG. 1
3,735,036  5/1973  Macouski............................ 178/6.8

Primary Examiner—Howard W. Britton
Assistant Examiner—Michael A. Masinick

[57] ABSTRACT

A surface roughness measuring instrument consists of an optical non-contacting system which focuses a thin light plane on the surface of a work specimen at an angle of about 45° with respect to the surface; a television camera focused onto the specimen surface at about the 45° reflected angle through the microscope camera port to provide a video signal corresponding to the topography of the surface; an analog converter connected to the video output to provide a modified light intensity signal and an analog signal; an oscilloscope connected to the analog signal to provide a visual signal monitor; and an arithmetic average analog computer connected to the analog signal.

6 Claims, 1 Drawing Figure

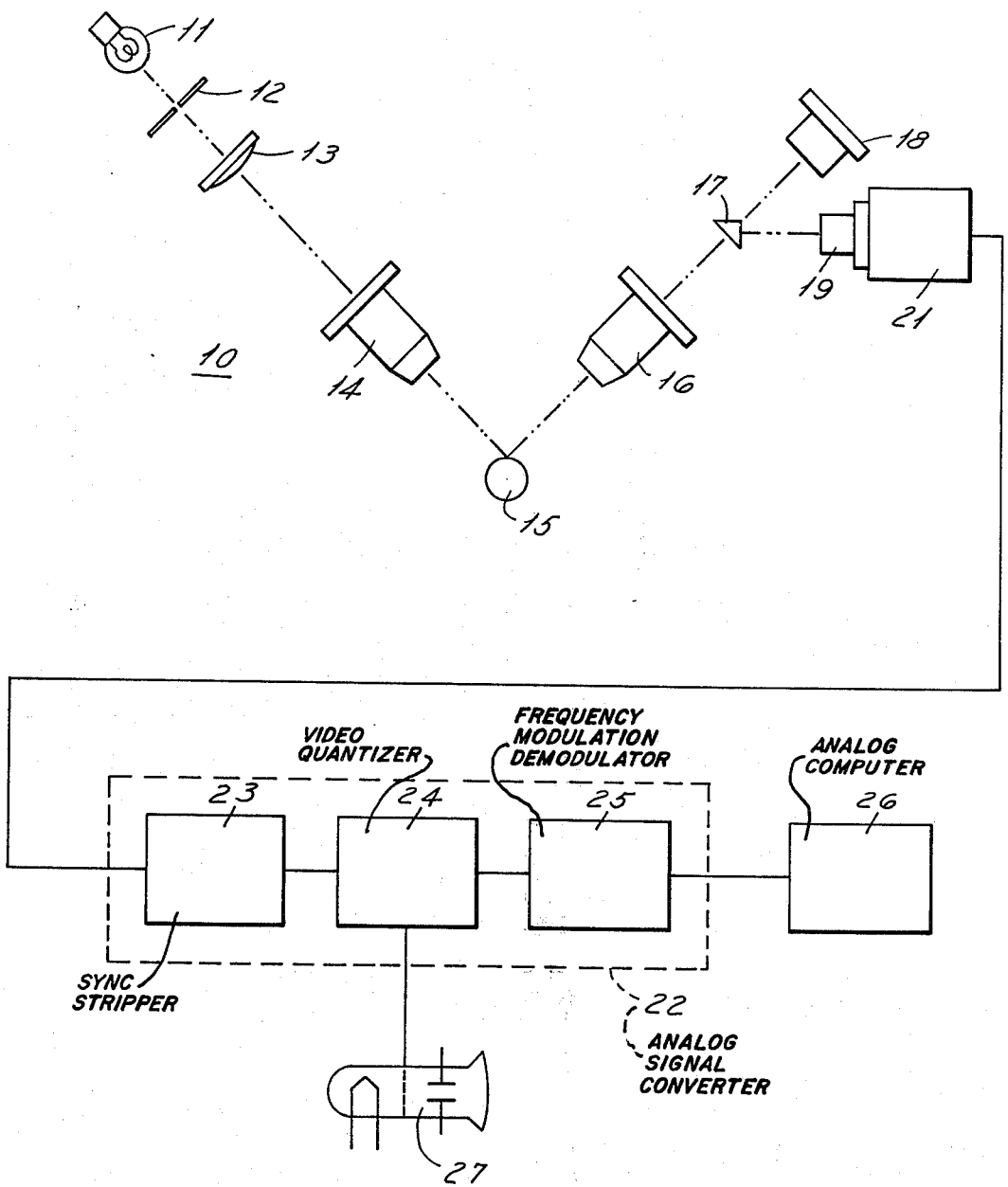

SURFACE ROUGHNESS MEASUREMENT INSTRUMENT

BACKGROUND OF THE INVENTION

The apparently smooth surface of a finish-machined part is really a series of peaks and valleys. The depth of the valleys, the spacing between peaks, and the wave form that connects them determine the degree of surface texture. Standard measurement and evaluation of these surfaces have been accepted in the United States as defined in American Standards Association Document B.46.1-1962, entitled "Surface Texture." The terminology used in discussing surface texture uses such terms as "roughness," "waviness," "roughness-width cutoff," "lay," and "flaws." Document B46.1-1962 also describes the measurement technique for evaluating the surface wave form to arrive at the arithmetic-average (AA), which is also referred to as "center line average" (CLA).

The first attempts at standardization of surface finishes were through the use of sight-touch gages which consisted of sample workpieces of varying roughness. With these a machinist could compare his workpiece with the gage by rubbing his fingernail across the lay of both. This simple method has been surprisingly effective for estimating the approximate roughness of a workpiece. However, a wide variety of methods for measuring surface roughness have been devised in the last thirty-five years and many of these are designed to avoid reliance on the judgment of the individual making the measurement.

Some of the measuring systems utilize a stylus which makes contact with the surface of the workpiece. Measurement of the motion of the stylus then determines the surface characteristic of the workpiece. Examples of stylus systems are given in Peklenik U.S. Pat. No. 3,544,744 and Sanders U.S. Pat. No. 3,529,240.

In a stylus system the stylus is the key item. It must contact every small contour of the surface. The stylus normally has a diamond tip with 0.0005 inch radius loaded with less than a 2.5-gram normal force. Sometimes a finer stylus is used - one having a nose radius of 0.0001 inch and a maximum normal force of 100 milligrams. Assuming one-fourth of the surface of the standard tip makes contact with the specimen, a loading of 2800 psi is developed for the coarser tips. The bearing stress for the finer tip is calculated to be 20,800 psi. These stress values are high enough for scratching to take place on virtually every sample tested. On softer materials such as aluminum, copper and polymers, gouging occurs with a significant depth of scratch. Where a topographical trace is desired, there is a possibility that the peaks are cut into more seriously by the stylus than the valleys and thus the vertical heights may not be accurate. Thus, a stylus system is not satisfactory for adaptive control purposes.

Non-contacting methods for measuring surface roughness have been developed. One such method involves the use of a light-section microscope. Such a microscope projects a thin sheet of light on a test surface at an angle of 45° and perpendicular to the lay to provide a scalloped pattern identical to the profile of the test surface. Microscopic examination of this light section allows the necessary measurements of the peak-valley heights and peak-to-peak distance.

In order for the light section microscope to obtain a fine slit of light, the optical system focuses a slit image 0.0005-inch wide upon the test surface. A standard microscope objective-eyepiece system is used to view this slit image. There is no contact with the surface of the test piece although the objective lenses are relatively close due to the fact that high magnification lenses are used and, therefore, the focal length is short. Normally the magnification is in the range of 200X to 400X. A reticle in the eyepiece allows measurement of the width and height dimensions of the peaks and valleys. The surface roughness can be estimated from data thus obtained.

The principal object of the present invention is to provide a surface roughness measuring system utilizing the light section microscope principle in which the arithmetic average of the surface roughness is calculated automatically.

SUMMARY OF THE INVENTION

The basic components of the present invention include a light-section microscope, a television camera and monitor, a television signal-to-analog signal converter, an arithmetic-average analog computer and an oscilloscope. A light-section microscope is positioned to focus the light section on the surface of a test specimen. A television camera focused on the specimen through the microscope port provides a video output corresponding to the surface contour of the specimen. An analog converter connected to the video output provides a modified light intensity signal and an analog signal. An arithmetic-average analog computer connected to the analog signal provides a readout indication of surface roughness. The arithmetic-average analog computer can be connected to a servo system which controls cutting conditions of a workpiece to provide a surface of a preselected quality.

DESCRIPTION OF THE DRAWING

The drawing provides a schematic diagram of a light-section microscope and block diagrams of the other components comprising the system of the invention.

DESCRIPTION OF THE INVENTION

Referring to the drawing, a light-section microscope 10 consists of a light source such as a lamp 11 which emits light through a slit in a screen 12, a lens 13, and a focusing lens 14 onto a workpiece 15. The slit in the screen 12 is provided in a size which, combined with the lens 13 and focusing lens 14, will produce an image about 0.0005-inch wide on the surface of the test piece or specimen 15. The illuminated contour of the surface of the specimen 15 is viewed by an objective lens 16 and directed by means of a prism 17 either to an eyepiece 18 or camera port 19. The light-section microscope 10 is not described in greater detail herein as such instruments are well known and are available commercially. A television camera 21 with focusing lens attachment is attached to the camera port 19 of the microscope 10. While the television camera 21 may be a 525-line rate camera greater resolution is achieved with a higher line rate such as an 875-line rate camera. The camera 21 was set so that each line sweep across the tube would intersect the light section once, thus generating a pulsed-position-modulated output for conversion to an analog signal. This constituted a video output from the television camera 21.

The video output from the camera 21 was connected to an analog signal converter 22 which consisted of a sync stripper 23, a video quantizer 24, and a frequency modulation demodulater 25.

The signal coming to the converter 22 was a pulse-position-modulated signal due to the orientation of the television camera to the light section of the test specimen surface. Each line of the television signal was reproducing a dark field background from the raster until it was positioned at the bright field of the light section. After it progressed through this bright field, it returned again to a dark field. Thus, a pulsed voltage occurred at the intersection of the light section only.

The video quantizer 24 was used to desensitize the voltage levels of the light and dark regions of each line in such a manner that its output was either off or on. This provided the gating signal to the demodulater 25 for conversion of the television signal to an analog signal.

The demodulater 25 included a ramp generator that was reset by the television horizontal sync. This ramp was gated off by the signal from the quantizer 24 and that voltage was held until the next reset. Since the time from raster to the wave form of the light section varied with each successive line, the voltage output of the demodulater 25 converted the pulse-position-modulated signal to an analog signal. This signal was then an analog replica of the optical image produced by the microscope 10. This signal could then be analyzed to determine the arithmetic-average value by an analog computer 26. The signal from the quantizer 24 is also passed to a cathode ray oscilloscope 27 which serves as a visual monitor of the surface roughness.

The arithmetic-average of surface roughness can be calculated from the signal emerging from the analog converter. If the surface roughness is represented as a profile plot with respect to time, and a center line is drawn through the plot dividing the "peaks" and "valleys" into equal areas, the arithmetic average can be obtained by adding plot values at periodic intervals without regard to sign, and dividing by the number of values added. The analog computer 26 calculates the arithmetic average of the plot wave form in 1/30 second — the time for one complete frame of a television picture. Each frame of the television picture is divided into two 1/60 second fields by 2:1 positive interlace scanning. The analog signal has a "hold" circuit which holds the last value of the signal during the scan recess time when no signal occurs. Two of these fields comprise one frame. The first field is analyzed to find the centerline. This value is held during the second field to be used in finding the distance between the plot line and center line. A number of these distance measurements are taken at rapid intervals and integrated by the computer 26 to calculate the arithmetic average.

The output of the computer 26 can be connected to a servo system (not shown) to accomplish a control function. For example, if the computer 26 shows that the arithmetic average is too great the servo system may be actuated to modify the operating conditions of the cutting machine in order to provide a smoother surface.

The oscilloscope 27 provides a monitoring function which can be very useful during operation of the system. However, it is not necessary for successful operation of the system and may be omitted.

Comparative surface roughness measurements using the system of this invention against a stylus system showed that both systems gave equally accurate readings. Thus, the present system avoids the workpiece disfigurement and stylus wear caused when a stylus system is used. The system of the present invention also works very well as an adaptive control device.

Testing also showed that the invention was effective in measuring the radial dimension of the workpiece being machined on the lathe. Once the microscope was focused on the surface of the workpiece (a known and measured distance from the center line of the workpiece) variations in radial dimension (run-out) were measurable as the light section slit image went out of focus due to the change of distance between the objective lens of the microscope and the surface of the workpiece. The ratio of the distance to the focal length of the objective lens provides a very accurate measurement of the radial dimension of the workpiece. This sensitive dimensional measurement capability is applicable to all uses of the invention.

While the invention has been described with reference to certain specific embodiments, it is obvious that there may be variations which properly fall within the scope of the invention. Therefore, the invention should be limited in scope only as may be necessitated by the scope of the appended claims.

What I claim as new and desire to secure by Letters Patent of the United States is:

1. A system for determining the roughness of a surface comprising:
    a light-section microscope positioned to focus on the surface of a test specimen;
    a television camera focused on the specimen through said microscope to provide a video output corresponding to the surface topography of said specimen;
    a television signal to analog converter connected to said video output to provide a modified light intensity signal and an analog output signal; and
    an arithmetic average analog computer connected to said analog signal.

2. A system as claimed in claim 1 wherein the light-section microscope includes an optical eyepiece and a camera port and the television camera is focused through said camera port.

3. A system as claimed in claim 1 wherein the television camera is disposed to make a perpendicular sweep with reference to the light plane of the microscope.

4. A system as claimed in claim 1 wherein a monitoring oscilloscope is connected to the light intensity signal.

5. The method of determining the roughness of a surface which comprises;
    positioning a light-section microscope having a camera port with the light plane thereof focused on the surface of a test specimen from an angle of about 45°;
    focusing a television camera on said specimen through said camera port whereby said camera provides a video output corresponding to the surface topography of the test specimen;
    passing said video output through an analog converter to provide a modified analog signal; and
    passing said analog signal to an analog computer which computes an arithmetic average of said analog signal.

6. The method of claim 5 wherein the television camera makes a perpendicular sweep with reference to the light plane of the microscope.

* * * * *